(12) United States Patent
Hamilton, II et al.

US008713181B2

(10) Patent No.: US 8,713,181 B2
(45) Date of Patent: Apr. 29, 2014

(54) METHOD FOR TRANSFERRING INVENTORY BETWEEN VIRTUAL UNIVERSES

(75) Inventors: Rick Allen Hamilton, II, Charlottesville, VA (US); Steven Mark Harrison, Bremerton, WA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1556 days.

(21) Appl. No.: 11/833,426

(22) Filed: Aug. 3, 2007

(65) Prior Publication Data

US 2009/0037905 A1    Feb. 5, 2009

(51) Int. Cl.
*G06F 15/173* (2006.01)

(52) U.S. Cl.
USPC ............ 709/226; 709/223; 709/225; 709/229

(58) Field of Classification Search
USPC .................. 709/217–219, 226, 227, 228, 229
See application file for complete search history.

(56) References Cited

U.S. PATENT DOCUMENTS

| | | | |
|---|---|---|---|
| 5,608,850 A | 3/1997 | Robertson | |
| 6,263,363 B1 | 7/2001 | Rosenblatt | |
| 6,342,907 B1 | 1/2002 | Petty et al. | |
| 6,532,474 B2 | 3/2003 | Iwamoto | |
| 6,784,901 B1 | 8/2004 | Harvey et al. | |
| 6,806,890 B2 | 10/2004 | Audleman et al. | |
| 6,944,821 B1 | 9/2005 | Bates et al. | |
| 7,015,954 B1 | 3/2006 | Foote et al. | |
| 7,031,951 B2 | 4/2006 | Mancisidor | |
| 7,080,161 B2 | 7/2006 | Leddy | |
| 7,082,436 B1 | 7/2006 | Bayiates | |
| 7,099,745 B2 | 8/2006 | Ebert | |
| 7,148,892 B2 | 12/2006 | Robertson et al. | |
| 7,216,290 B2 | 5/2007 | Goldstein et al. | |
| 7,269,632 B2 | 9/2007 | Edeker et al. | |
| 7,298,378 B1 | 11/2007 | Hagenbuch et al. | |
| 2002/0026645 A1* | 2/2002 | Son et al. ................... | 725/117 |
| 2003/0191841 A1 | 10/2003 | DeFerranti | |
| 2004/0143852 A1* | 7/2004 | Meyers ................... | 725/133 |
| 2005/0008240 A1 | 1/2005 | Banerji et al. | |
| 2005/0137015 A1* | 6/2005 | Rogers et al. ............... | 463/42 |
| 2005/0138042 A1 | 6/2005 | Foo | |
| 2006/0031578 A1 | 2/2006 | Pelletier | |

(Continued)

OTHER PUBLICATIONS

Fosner, "OpenGL Programming for Windows 95 and Windows NT," Addison-Wesley, Oct. 1996.*

(Continued)

*Primary Examiner* — Dhairya A Patel
(74) *Attorney, Agent, or Firm* — Arthur Samodovitz; Robert C. Rolnik (57) ABSTRACT

The present invention provides a computer implemented method for transferring an item from a source virtual universe to a target virtual universe. A target virtual universe host opens a session between a source virtual universe host and itself. Next, it determines that the source virtual universe host is authorized to transmit the item to the target virtual universe host. Next, it receives a command from a client computer to transfer the item from the source virtual universe host to the target virtual universe host. Next, it receives item data in the target virtual universe host.

6 Claims, 8 Drawing Sheets

(56) References Cited

U.S. PATENT DOCUMENTS

| | | | |
|---|---|---|---|
| 2006/0155667 A1 | 7/2006 | Tolba | |
| 2006/0287106 A1* | 12/2006 | Jensen | 463/42 |
| 2007/0293319 A1* | 12/2007 | Stamper et al. | 463/42 |
| 2007/0294171 A1 | 12/2007 | Sprunk | |

OTHER PUBLICATIONS

Muller et al., "Rokkatan: Scaling an RTS Game Design to the Massively Multiplayer Realm", ACM Computers in Entertainment, V4 N3, Jul. 2006.*
Kawulok et al., "Trusted Group Membership Service for JXTA," Springer Berlin/Heidelberg, V3038, May 12, 2004, p. 218-25.*
Business Week; My Virutal Life; Magazine; May 1, 2006; http://www.businessweek.com/print/magazine/content/O6_18/b39820.
Wikipedia; Machine Readable; Internet website; Aug. 30, 2007 (page last modified date); http://en.wikipedia.org/wiki/machine_readable.
IBM; Grid Explained; Whitepaper; Jan. 2005; ftp://ftp.software.ibm.com/common/ssi/rep_wh/n/RWOO9OOUSEN/GRW00900USEN.pdf.
Brain; How Web Servers Work; Internet website; Sep. 17, 2007 (page download date); http://www.howstuffworks.com/web-server.htrn/printable.
McKenna; How Virtual Computing Works; Internet website; Sep. 17, 2007 (page download date); http//:www.howstuffworks.how-virtual-computing-works.
Wikipedia; Machine-readable Medium; Internet website; Jun. 14, 2006 (page last modified date); http://en.wikipedia.org/wiki/Machine-readable-medium.
Tyson; How Virtual Private Networks Work; Internet website; Sep. 17, 2007 (page download date); http://computer.howstuffworks.com/asp.htm/printable.
Qarchive; Stitching; Internet website; Nov. 19, 2007 (page download date); http://stitching.qarchive.org.
Pham, Hung Q.; Non-Final Office Action; Date: Jun. 22, 2010; U.S. Appl. No. 12/026,045; USPTO.
Linden Research, Inc.; Second Life; Date: 2007; URL: http://web.archive.org/web/20071231233917/http://secondlife.com.
Jennings, Erin; A Basic Guide to Second Life; pp. 1-18; Date: 2007; The University of Texas at Dallas School of Management.
Rolnik, Robert C; Response to Office Action; dated Oct. 4, 2011; U.S. Appl. No. 11/936,900; USPTO.
Vu, Thanh; Notice of Allowance; dated Dec. 2, 2011; U.S. Appl. No. 11/936,900; USPTO.
Rolnik, Robert C; Response to Office Action; dated Dec. 12, 2011; U.S. Appl. No. 12/046,771; USPTO.
Hamilton II, Rick A; Response After Final Office Action; U.S. Appl. No. 12/046,771; Mar. 8, 2012.
Barrett, Ryan S.; Final Office Action; Jan. 20, 2012; U.S. Appl. No. 12/046,771.
Barrett, Ryan S; Office Action; dated Sep. 12, 2011; U.S. Appl. No. 12/046,771; USPTO.
Vu, Thanh; Office Action; dated Jul. 5, 2011; U.S. Appl. No. 11/936,900; USPTO.
Rolnik, Robert C; Response to Office Action; Dated: Dec. 22, 2010; U.S. Appl. No. 11/936,900; USPTO.
Rolnik, Robert C.; Response to Office Action; dated Feb. 25, 2011; U.S. Appl. No. 12/046,771; USPTO.
Vu, Thanh T; Final Office Action; Dated: Mar. 11, 2011; U.S. Appl. No. 11/936,900; USPTO.
Barrett, Ryan S; Final Office Action; dated Mar. 21, 2011; U.S. Appl. No. 12/046,771; USPTO.
Pham, Hung Q; Notice of Allowance; dated May 10, 2011; U.S. Appl. No. 13/006,201; USPTO.
Rolnik, Robert C.; Amendment After Final Office Action; dated May 18, 2011; U.S. Appl. No. 12/046,771; USPTO.
Rolnik, Robert C.; Request for Continued Examination; dated Jun. 8, 2011; U.S. Appl. No. 12/046,771; USPTO.
Rolnik, Robert C.; Request for Continued Examination; dated Jun. 9, 2011; U.S. Appl. No. 11/936,900; USPTO.

* cited by examiner

FIG. 2A

```
<asset>                                                              280
    <information>
        <type>
            object // what kind of asset is this - object, texture, animation, clothing, etc.
        </type>
        <name>
            Cube    ←—207
        </name>
        <asset id>
            2a39636e-709b-de3a-c944-9397d3a20c13 // our internal asset id reference
        </asset id>
        <time created>
            27062007130107 // timestamp when entered into our database
        </time created>
        <owned by>
            fe42ec29-a173-1823-fa34-a8e9216edda0 // our internal owner reference
        </owned by>
        <originated from>
            Virtual Universe 1  ←—218
        </originated from>
        <original owner>
            083af90a-05e6-d939-132a-a2bddef0587e // the UUID of the object's
            owner in the original VU
        </original owner>            226
        <original id>
            8ec69dd5-aeb9-dba3-271a-eb07aaff8db5 // the UUID of the object in
            the original VU
        </original id>
    </information>
    <representation>
        <type>
            primitive // the type of object, primitive, polygon, wire-frame, etc
        </type>
        <dimensions> // sizes of each side of the object - should give another VU an idea of
            how to render the object
            <x>
                0.5 </x>
            <y>
                0.5 </y>      } 234
            <z>
                0.5 </z>
            <s>
                0.0 </s>
```

FROM FIG. 2B-1

```
        </dimensions>
        <texture> // the different textures applied to each side of the object, starting at side 0
                <side>
                        68189f8a-2376-df46-1587-b1f99384770b </side>
                <side>
                        68189f8a-2376-df46-1587-b1f99384770b </side>
                <side>
                        68189f8a-2376-df46-1587-b1f99384770b </side>
                <side>
                        68189f8a-2376-df46-1587-b1f99384770b </side>
                <side>
                        68189f8a-2376-df46-1587-b1f99384770b </side>
                <side>
                        68189f8a-2376-df46-1587-b1f99384770b </side>
        </texture>
        <physical>
                FALSE // object is non-physical, and should not be affected by the virtual
                universe's physics engine
        </physical>
        <contains> // does this object contain anything - we'll need to transfer that over too!
                <content> // include as many '<content>' items as required
                        c74c0617-e440-d2af-f642-4646108c966c // our UUID for
                        another asset in our database
                </content>
                <content>
                        aa354eb1-be33-1a1d-a642-0aaeb7fc5cee
                </content>
        </contains>
    </representation>
</asset>
```

The braces group the six `<side>` entries as 248.

METHOD FOR TRANSFERRING INVENTORY BETWEEN VIRTUAL UNIVERSES

BACKGROUND OF THE INVENTION

1. Field of the Invention

The present invention relates generally to a computer implemented method for transferring items between virtual universes. More specifically, the present invention relates to obtaining an item from a virtual universe for management within a second virtual universe.

2. Description of the Related Art

Modern uses of networked computers leverage the graphics processing power of client computers. The client computer is a computer typically assigned the task of supporting user input and displaying output to a user. Many users reach online environments or virtual universes by using a client computer. A virtual universe permits a user to adopt an avatar or a graphical representation of the user. The user has the power to move the avatar, have the avatar interact with objects, and have the avatar interact with the avatars of other users.

A virtual universe depends on a coordinate system to create anchor points where avatars and other objects may be located for purposes of rendering the avatars and objects to each user's computer. Coordinates are two or more units that define a position in a virtual universe. The coordinates may be a Cartesian set of points that define planes and altitudes, however, global coordinates are also known to be used. Typically, an object has a location referenced by a triplet of numbers. The object may also have a region or other descriptor of a subset of space within the virtual universe.

In addition to a location, proper rendering of an object or avatar may depend on an orientation or attitude of the object or avatar. An attitude is an overall orientation of an object or avatar in relation to a plane or a vector. For example, an attitude may be based on a number of degrees that an object is offset from a positive direction along a coordinate axis. For virtual universes that form analogs to a real world, north and south compass points may correspond to a positive direction along a first axis and a negative direction along the same axis. East and west may be represented in a similar manner, along a second axis. A third axis may correspond to height. Attitudes may also include offsets measuring an angle above a plane.

Some virtual universes are organized to present an avatar within a three-dimensional environment. Such virtual universes may provide a "first person point of view." Within a first person point of view, a client computer renders scenery to a two-dimensional screen to produce a three-dimensional illusion or effect. An example of a three-dimensional illusion includes diminishing the size of an object as the object becomes relatively distant from the avatar's position in the virtual world. Another example of a three-dimensional illusion is displaying a object as obscuring a more distant object. Each of these illusions is controlled by rendering rules. Rendering rules are a set of rules or steps that a client computer executes to display the two-dimensional image so that the display provides impressions of depth comparable to what one would see in real-life scenery.

Many virtual universes provide a user with a teleport feature that permits a user to change an avatar location. The changed location causes a perspective of the avatar to change, and thus changes a screen image of the virtual universe. The perspective may cause objects to be rendered at different orientations and distances from the avatar. The perspective may cause formerly rendered objects to be obscured by other objects. Likewise, the perspective may cause formerly rendered objects to be so distant that the objects are not rendered in the second perspective. In this case, a client computer renders a new set of objects to the user's computer display screen.

Users frequently participate in multiple virtual universes. Unfortunately, objects that a user creates or acquires in one universe are not transferable to a second universe. Consequently, a user who creates an object in a first virtual universe must devote substantial time to recreating the object if he desires to have the same object appear in additional virtual universes. Because the avatar is also an object, a user also has difficulty making the same or similar avatar appear in additional universes. In addition to the mere transmitting of object data, the two virtual universe hosts that support two virtual universes may use different storage schemes for objects. Consequently, an object of a first virtual universe may be incompatible with a second virtual universe host even when the object is transferred to the second virtual universe.

Thus, a need exists to provide a user with a way to share objects under his control from one virtual universe to a second virtual universe.

SUMMARY OF THE INVENTION

The present invention provides a computer implemented method for transferring an item or asset from a source virtual universe to a target virtual universe. A target virtual universe host opens a session between a source virtual universe host and itself. Next, it determines that the source virtual universe host is authorized to transmit the item to the target virtual universe host. Next, it receives a command from a client computer to transfer the item from the source virtual universe host to the target virtual universe host. Next, it receives item data in the target virtual universe host.

The present invention also provides for the item being an avatar, and the item data being avatar data.

The present invention further provides for presenting an avatar attitude to the client computer based on the avatar data.

The present invention also provides that the source virtual universe host and the target virtual universe host are configured to support polygon based objects.

The present invention further provides that the source virtual universe host and the target virtual universe host are configured to support solid based objects.

The present invention further provides for commanding the source virtual universe host to inhibit visibility of an avatar to client computer sessions associated with the source virtual universe host.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
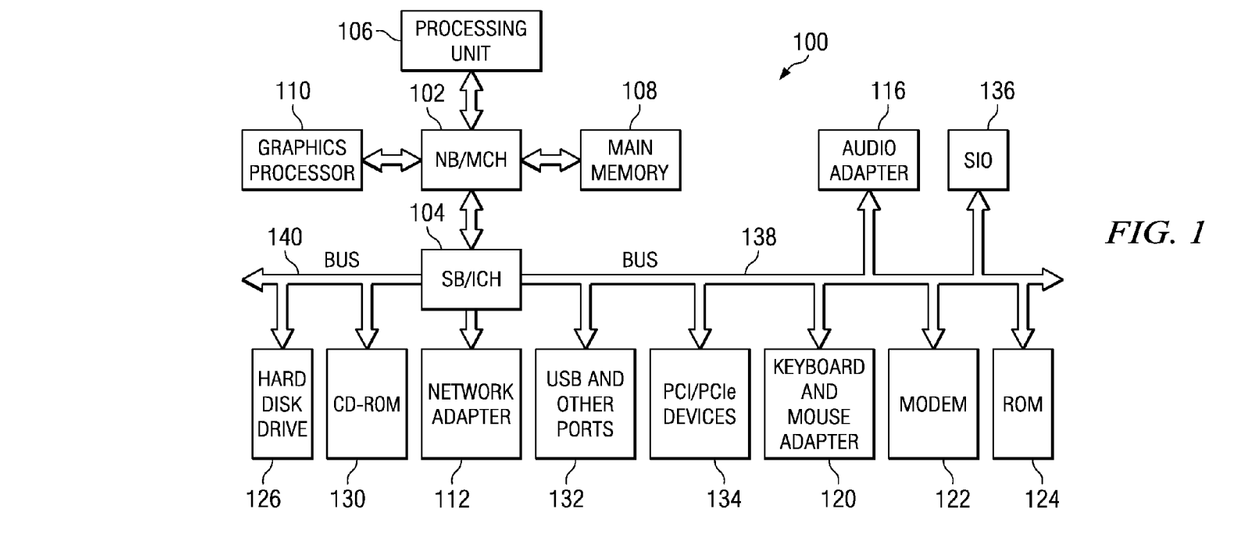
FIG. 1 is a data processing system in accordance with an illustrative embodiment of the invention.

With reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 are connected to north bridge and memory controller hub 102. Graphics processor 110 may be connected to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention are performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 and above-described examples are not meant to imply architectural limitations. For example, data processing system 100 also may be a tablet computer, laptop computer, or telephone device in addition to taking the form of a PDA.

The aspects of the illustrative embodiments provide a computer implemented method for transferring inventory between virtual universes. An inventory is a set of one or more items associated with a user account. An item is a description of a geometric shape or a description of operations performed on a geometric shape. Examples of items can include a script or an eXtensible Markup Language (XML) file that defines an object based on primitives. Primitives are further defined below.

Figure 2A:
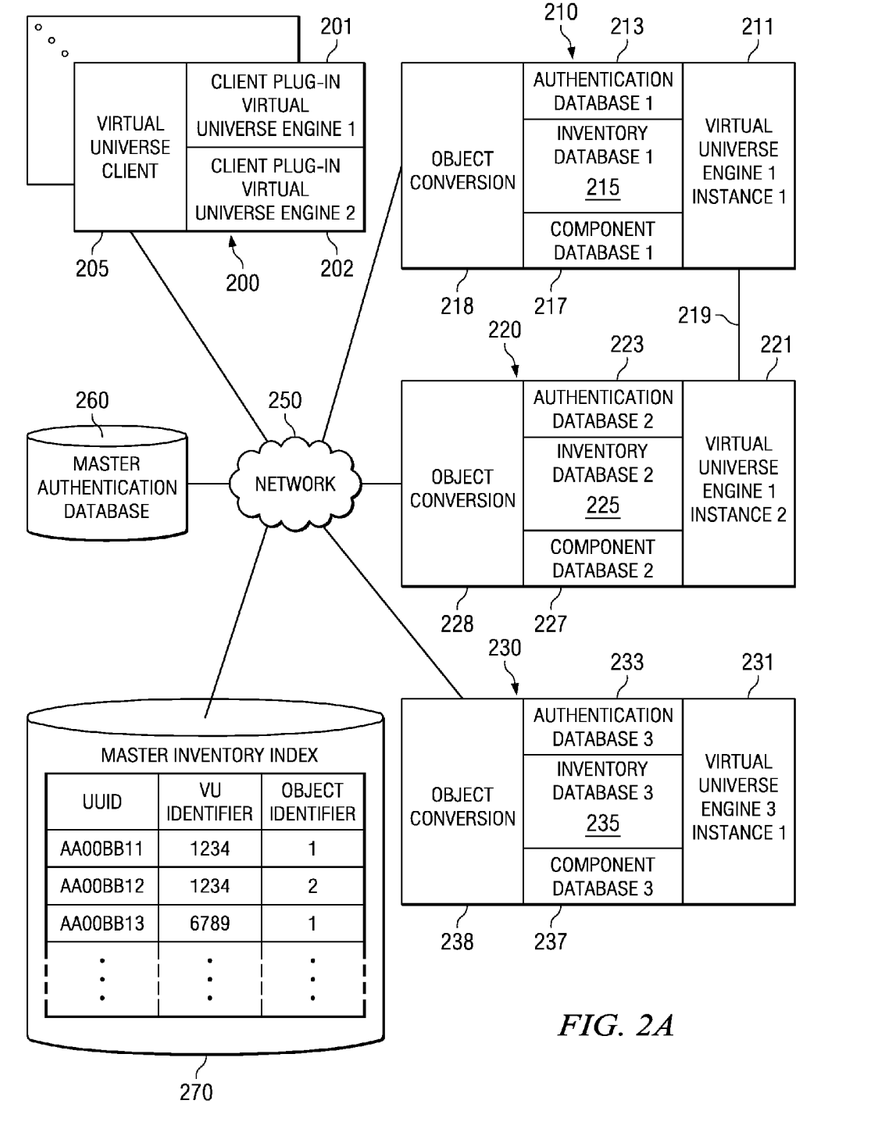
FIG. 2A is a diagram of a client computer interacting with computers hosting virtual universe engines in accordance with an illustrative embodiment of the invention.
Figure 2B:
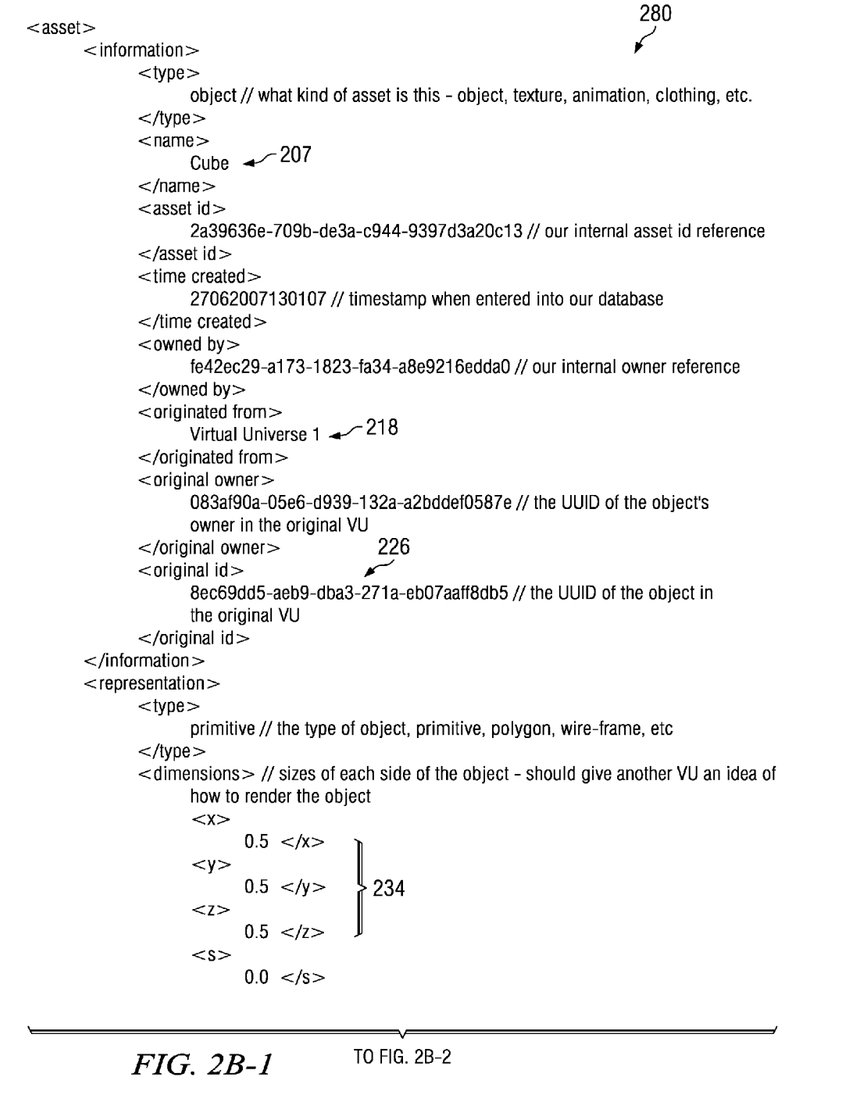
FIG. 2B shows an example of object descriptor file in accordance with an illustrative embodiment of the invention.
Figure 2B:
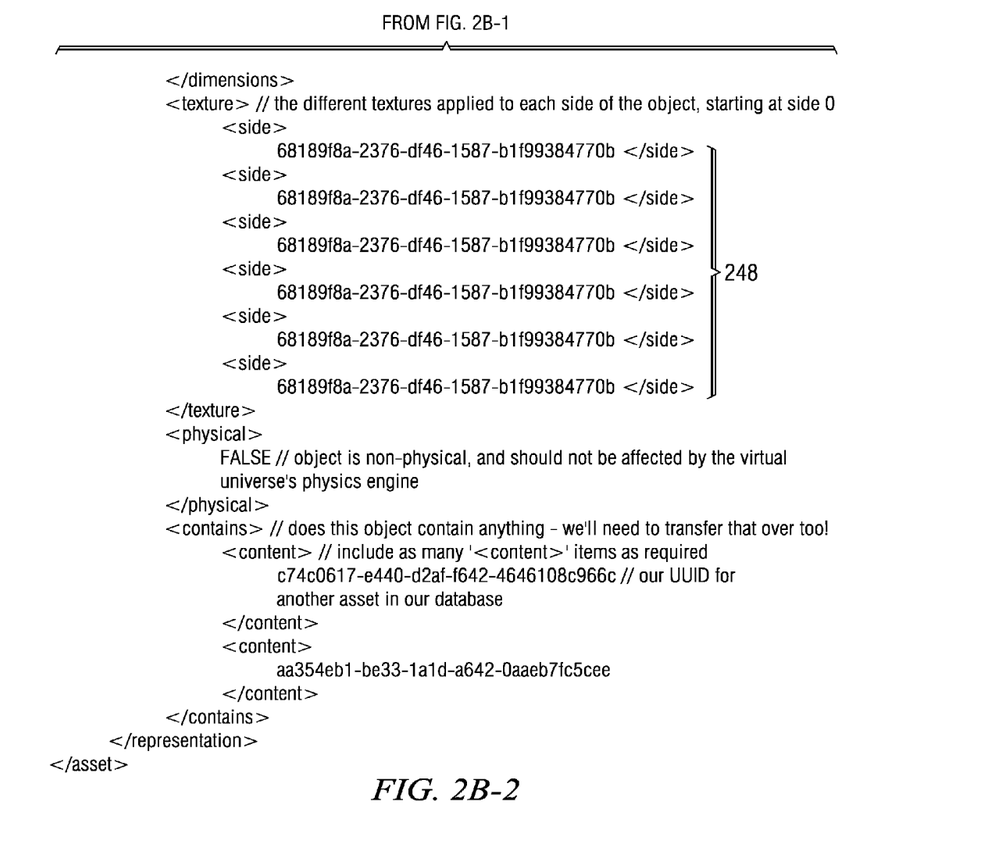

FIG. 2A shows a client computer interacting with computers hosting a virtual universe engine in accordance with an illustrative embodiment of the invention. Client computer 200 supports executing software, including virtual universe client 205. Virtual universe client 205 provides communication and rendering functions that are common to virtual universes made by different sources. The client computer 200 may be, for example, data processing system 100 of FIG. 1. The client computer may be one of many that interconnect to one or more virtual universes over network 250. Network 250 may be, for example, an ad hoc network or the Internet, among other networks.

In addition to virtual universe client 205, the client computer may also run a client plug-in software. The client plug-in exchanges data with the virtual universe client and provides extended features to the operation of virtual universe client 205. A client plug-in may provide a feature that corresponds with a feature supported in a virtual universe engine. For example, a virtual universe provider may want to provide real-time voice exchanges between a virtual universe and a virtual universe client. A plug-in for that virtual universe may provide computer instructions to a processor in order to assemble packets and provide routines to handle delay and jitter in packet transmission. Again, a processor for virtual universe host 210 may be, for example, processor 106 of FIG. 1. Thus, client plug-in virtual universe engine 1 201 may support functionality of a virtual universe engine 1 shown as virtual universe engine 1 instance 1 211. Additional client plug-ins, for example, client plug-in virtual universe engine 2 202 may be provided for additional virtual universes.

Virtual universe host 210 provides hardware support for several software components. In particular, virtual universe host 210 operates program instructions of a virtual universe engine. An author of code for a virtual universe engine provides the computer instructions or a copy of computer instructions to the virtual universe host 210. The virtual universe host allocates memory and other hardware resources each time the virtual universe engine is invoked. By invoking and allocating hardware, the virtual universe host 210 creates an instance of the virtual universe engine, namely virtual universe engine 1 instance 1 211. In general, each virtual universe engine instance provides a central control along with management functions. Controlled aspects include terrain of a virtual universe, objects, scripts, and other aspects associated with the virtual universe or virtual universe region. Specialized functions are accomplished when the virtual universe engine instance exchanges information with databases and other software components.

Virtual universe engine 1 instance 1 211 interacts with supporting databases. Each database may record data in a permanent storage of the processing system, for example, a hard drive such as hard disk drive 126 of FIG. 1. For example, authentication database 1 213 may provide a lookup feature for login and password pairs. Thus, authentication database 1 213 may permit proper admission of a client computer to connect to features of virtual universe engine 1 instance 1 211.

In addition, any inventories associated with each avatar may be looked up, modified, and otherwise manipulated within inventory database 1 215. Inventory database 1 215 is a database that stores objects that may be rendered within the virtual universe managed by virtual universe engine 1 instance 1 211. Objects are described further below. In addition, the inventory database 1 215 may store information concerning scripts. A script is a set of program instructions that controls an object. An example of a script language is the Linden Scripting Language by Linden Research, Inc. When a client computer moves an associated avatar to a region, the virtual universe engine 1 instance 1 211 may obtain objects and scripts from the inventory database 1 215 and present such data to the applicable client computer.

In similar fashion, content database 1 217 may be accessed in order to provide data concerning textures and shading to be applied to surfaces of virtual universe objects.

Additional virtual universes are accessible to client computer 200 over network 250. Virtual universe host 220 hosts a virtual universe in accordance with a system and representation that is common to virtual universe host 210. The virtual universe provided by virtual universe host 220 has common features because virtual universe engine 1 instance 2 221 is a copy of virtual universe engine 1 instance 1 211. Second virtual universe host 220 provides authentication database 2 223, inventory database 2 225, and content database 2 227. Unlike virtual universe host 210, the databases of virtual universe host 220 may be under a separate authority and require authentication credentials and processes different than those credentials in use at virtual universe host 210.

Enhanced interconnect and data portability may be available using direct connection 219 between virtual universe host 210 and virtual universe host 220. The cable may permit a session to be established between the two host computers. A session is a coordinated state between two computers where at least one of the computers is authenticated to the second computer. In addition, alternative configurations may allow secure interconnection between host computers over network 250. A session may achieve coordinated states over a direct connection or a network such as network 250.

Virtual universe host 210 may operate as a target virtual universe host or a source target virtual universe host. A target virtual universe host is a virtual universe host among a pair of virtual universe hosts that is configured to receive an item from the source virtual universe host. Accordingly, the source virtual universe host is configured to send or otherwise be a source for an item for the pair of virtual universe hosts. A given virtual universe host may switch roles in accordance with the commands or requests made by a virtual universe client. In other words, a virtual universe host may be a target in some transactions, and a source in other transactions.

In contrast to virtual universe host 220, virtual universe host 230 operates a virtual universe engine of a different manufacturer. Consequently, virtual universe engine 3 instance 1 231 may offer a set of features to users that varies from the features offered by virtual universe host engine 1 instance 1 211 and virtual universe host 220. Nevertheless, virtual universe 3 instance 1 231 may coordinate many functions using authentication database 3 233, inventory database 3 235, and component database 3 237.

Because of a mismatch of features between virtual universes of different manufacturers, a computer program product may provide an instance or software component on a virtual universe host to convert objects and scripts. For example, object conversion 238 instance on virtual universe host 230 may provide functionality to receive objects of virtual universe host 210 or virtual universe host 220. In addition to receiving objects, object conversion 238 may change a representational scheme of an object.

Additional elements to permit inter-operation between virtual universes hosts include master authentication database 260 and master inventory index 270. The master authentication database may securely store several sets of passwords and other account details for a user. Each set of password and account details is associated with a single user and a single virtual universe. A user may sign-on to the master authentication database and retrieve such passwords and details as are needed to establish a secure session between a client computer and a virtual universe host. Alternatively, master authentication database 260 may operate as a proxy to a user and mediate a session between client a computer and a virtual universe host.

The master inventory index 270 hosts object references for those virtual universe hosts that participate in a federated access to inventory. The content and use of the master inventory index 270 is described further below with respect to FIG. 4B.

FIG. 2B shows an example of object descriptor file 280 in accordance with an illustrative embodiment of the invention. An object can be stored, for example, within inventory database 1 215 of FIG. 2. The object descriptor file, in this example, describes the object with eXtensible Markup Language (XML). Within object descriptor file 280 are various identifiers and attributes of the object. In this case, the name of the object appears as "cube" 207. A source or originating universe is identified by "virtual universe 1" 218. Universally unique identifier (UUID) 226 may identify the object within the originating universe. The UUID, in this case, is 8ec69dd5-aeb9-dba3-271a-eb07aaff8db5. Universally unique identifiers (UUIDs) are defined by Recommendation ITU-T X.667 of the International Telecommunication Union. A UUID is a 16-byte number, which may be generated by a pseudorandom number generator. Nevertheless, some bits of the UUID may be established as constant according to agreed upon standards. The UUID of this example uses hexadecimal digits. Dimensions section 234 of the object descriptor file may define an object's dimensions. In addition, this object has a hierarchical arrangement with other assets, for example, textures 248 for six sides of a cube. Such textures may themselves be references to XML files wherein the texture, as referenced in the object descriptor file, is a UUID that corresponds to the XML file that describes the texture. In this example, the textures are repeated over the six sides of the cube.

Figure 3:
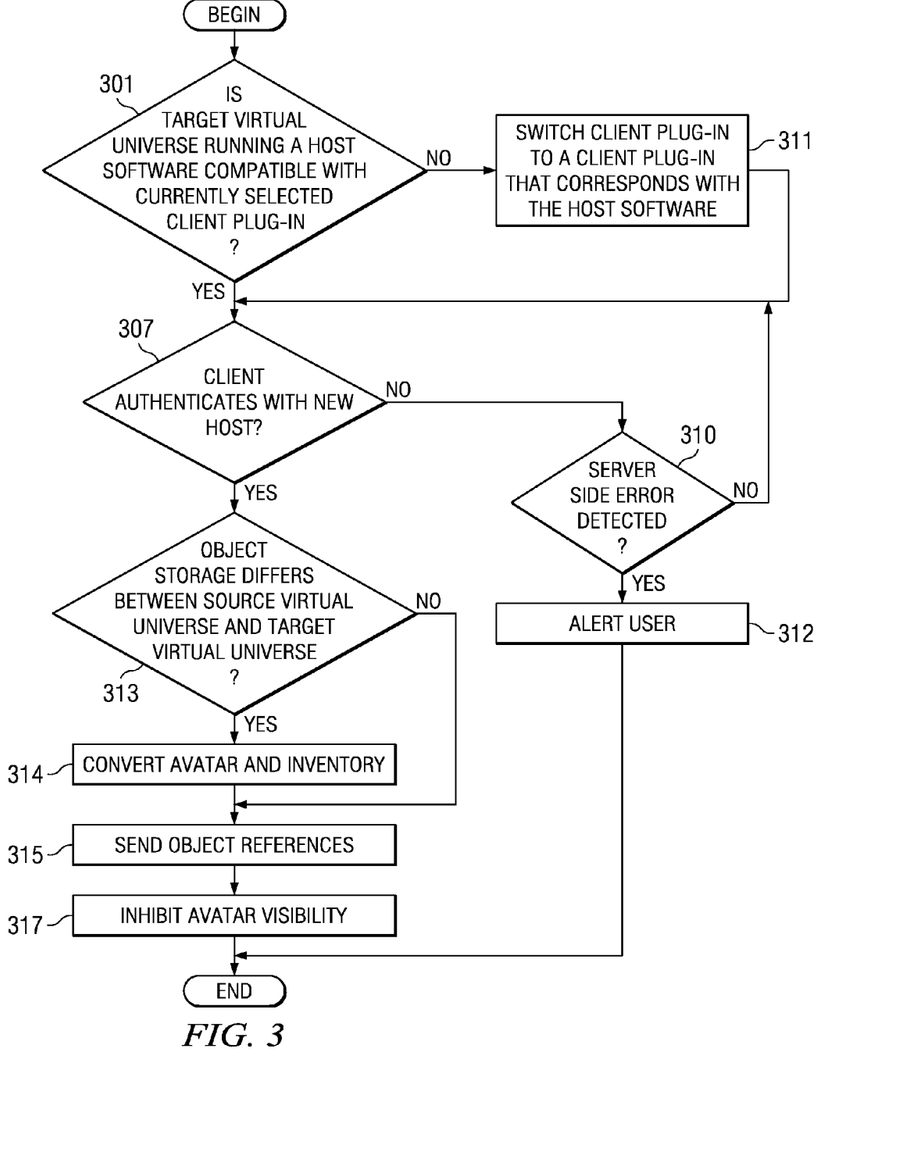
FIG. 3 shows a flowchart of steps performed at a client computer to transfer an inventory from a source virtual universe host to a target virtual universe host in accordance with an illustrative embodiment of the invention.

FIG. 3 shows a flowchart of steps performed at a client computer to transfer an inventory from a source virtual universe host to a target virtual universe host in accordance with an illustrative embodiment of the invention. A target virtual universe is a virtual universe instance supported by a virtual universe host. Similarly, a source virtual universe is a virtual universe instance supported by a virtual universe host. When the steps of FIG. 3 are complete, the avatar, and optionally any inventory are available in the target virtual universe host, and optionally invisible in the source virtual universe host. Initially, the client computer determines if the target virtual universe host is running a host software compatible with the currently selected client plug-in (step 301). If the host software is not compatible, the client computer switches the selected client plug-in to a client plug-in that corresponds with the host software of the target virtual universe host (step 311). Otherwise, the client computer continues without changing the selected client plug-in. Next, the client computer determines if the client computer authenticates with the new host (step 307). The client may retrieve a password from a master authentication database, for example, master authentication database 260 of FIG. 2. The password, in this example, can be applied to the target virtual universe in step 307.

Absent client authentication, the client computer determines whether a server side error occurred (step 310). If not, the client computer may make further attempts to authenticate with the target virtual universe host at step 307. No server side error may be detected, for example, if the client computer transmits a password. On the other hand, if a server side error is detected, the client computer alerts the user (step 312). Processing terminates thereafter.

If the client computer authenticates with the target virtual universe host at step 307, the client computer may command the target virtual universe host to convert avatars and other items. For example, conversion may be used where a source virtual universe bases objects on a primitive type that differs from the primitive types in use at the target universe. Consequently, the client computer may determine whether object storage differs between source virtual universe and target virtual universe (step 313). If so, the client computer converts accordingly (step 314). Conversion is explained further below. Next, the client computer may command the source virtual universe to send object references to the target universe host (step 315). The client computer may next command the source virtual universe host to inhibit visibility of an avatar within the source virtual universe (step 317). Consequently, the avatar may become invisible or otherwise inhibited in communications from the source virtual universe host to client computers in session with the source virtual universe host (step 317). If the avatar was rendered to additional client computers at the time the visibility was inhibited, then the source virtual universe host may send a message to any such client computers to cease rendering the avatar. The process terminates thereafter.

Figure 4A:
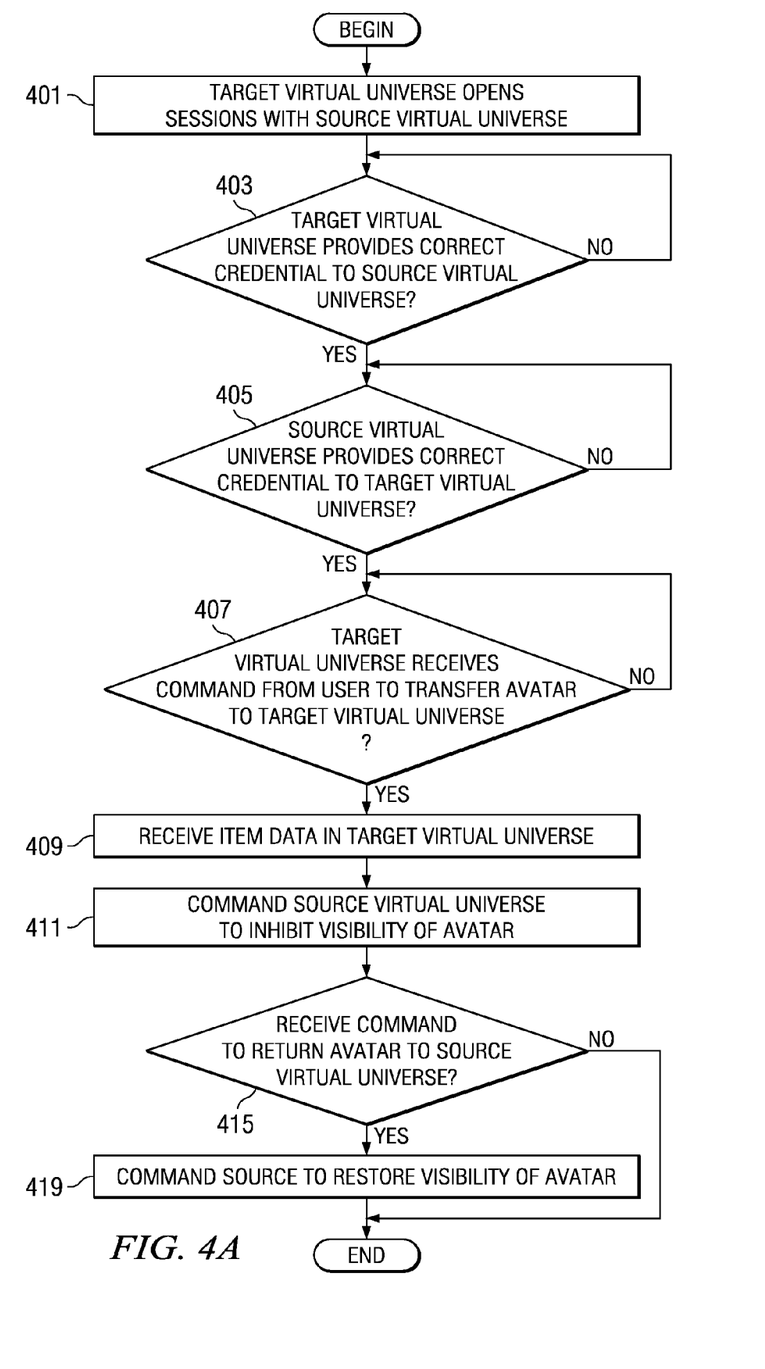
FIG. 4A shows a flowchart of steps to receive an item in the virtual universe of a target virtual universe host in accordance with an illustrative embodiment of the invention.

FIG. 4A shows a flowchart of steps to receive an item in the virtual universe of a target virtual universe host in accordance with an illustrative embodiment of the invention. The target virtual universe opens a session with the source virtual universe (step 401). The source virtual universe may be hosted, for example, on virtual universe host 210 of FIG. 2. The target virtual universe may be hosted, for example, on virtual universe host 220 of FIG. 2. The session may be by direct connection, for example, by connection 219 of FIG. 2.

Next, the target virtual universe host determines whether the target virtual universe host provided the correct credentials to source virtual universe host (step 403). A virtual universe is authorized with respect to a second virtual universe if the credentials presented by the first virtual universe match credentials established at the second virtual universe. The authorization may extend to sending and receiving items. If the target virtual universe host did not provide the correct credentials, the target virtual universe host may retry presenting credentials. Alternatively, the target virtual universe host may log the determination and terminate the process. However, a positive determination to step 403 may lead to the target virtual universe host determining whether the source virtual universe provided correct credentials to the target virtual universe (step 405). A negative determination may result in the target virtual universe host retrying step 405. Otherwise, a positive determination causes further processing. At this point, following a positive determination to step 405, the target virtual universe host is authenticated to the source virtual universe host and the source virtual universe is authenticated to the target virtual universe.

Next, the target virtual universe host determines whether the target virtual universe host receives a command from a client computer to transfer an item such as an avatar to the target virtual universe (step 407). A command is a message carrying a predetermined identifier that is accepted by convention at a virtual universe host as an instruction to execute a predetermined feature or function. A negative determination causes the target virtual universe host to re-execute step 407 continuously. A positive determination causes the target virtual universe host to receive item data (step 409). For example, the target virtual universe host may forward the command to the source virtual universe host. In response, the source virtual universe host may transmit the item data in support of step 409. The process terminates thereafter.

Figure 4B:
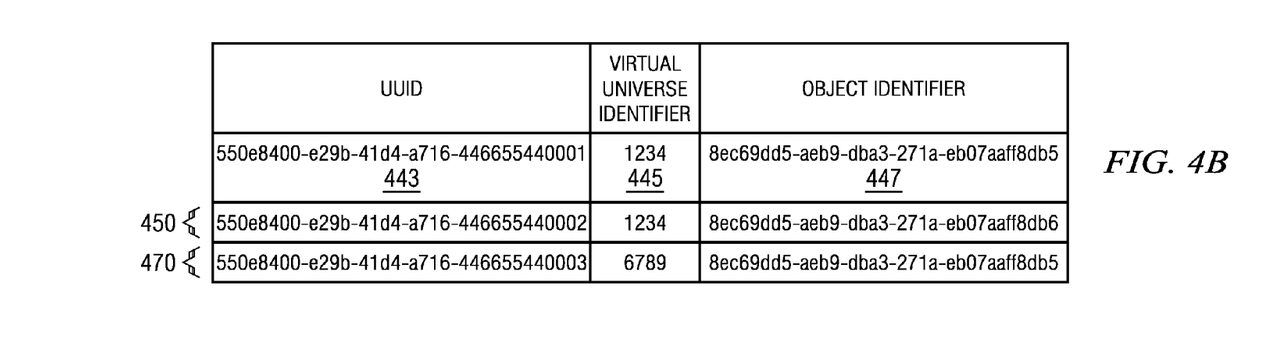
FIG. 4B shows a data structure of the master inventory database in accordance with an illustrative embodiment of the invention.

FIG. 4B shows a data structure for storing items of a plurality of virtual universes. Each item may be assigned a unique identifier, such as, for example, a universally unique identifier (UUID) 443. The data structure may store and retrieve data concerning how to locate and retrieve the source data of each item referenced by the UUID. For example, UUID 443 may have corresponding record fields of virtual universe identifier 445 and object identifier 447. A virtual universe identifier is an identifier that uniquely identifies a virtual universe hosted by one or more virtual universe hosts. An object identifier is an identifier that uniquely identifies an object within a virtual universe. Thus, the combination of a virtual universe identifier and an object identifier may uniquely identify an object among several virtual universes. An additional item in the same virtual universe as UUID 443 is found at row 450. In contrast, row 470 describes an item of a different virtual universe.

Item data is information used by a virtual universe host to establish an object or a script within the virtual universe. Item data defines the geometry of an object or the steps of a script.

Item data includes the contents of the object descriptor file of FIG. 2B. The item data may provide references or parameters with which the object interacts with additional items of the virtual universe. For example, a parameter to a script may be an object identifier. In this example, the script, as defined above, may operate on the data of an object to achieve an effect. For example, an effect may be to invert the orientation of an object. Another effect may be to operate on objects subordinate to a main object, for example, adjusting the position of an avatar's legs to create an illusion of jumping when the avatar is rendered. In this example, the legs are defined by item data for an object, namely the avatar. Thus, the item data may be avatar data. Avatar data is data that defines a geometry for a humanoid figure, wherein the virtual universe host compares the defined geometry and associated location to simulate various interactions with objects in the virtual universe. Avatar data may include attitude information. An attitude is an overall orientation of an object or avatar in relation to a plane or a vector. For example, an attitude may be based on a number of degrees that an object is offset from a positive direction along a coordinate axis. Like object data, an avatar may be defined by an object descriptor file, for example, object descriptor file 280 of FIG. 2.

Returning to FIG. 4A, next, the target virtual universe host may command the source virtual universe to inhibit visibility of the avatar (step 411). The source virtual universe host may set a predetermined bit in a data record associated with the avatar to configure the source instance of the avatar for invisibility. Consequently, client computers that operate avatars in the region of the source instance of the avatar accordingly inhibit rendering the avatar. The client computers, in this example, will not display or otherwise render the source instance avatar to a display that shows a viewport of the source virtual universe.

A user may desire to return his avatar to the source virtual universe after finishing his session at the target virtual universe. The target computer may receive a request to return the avatar to the source virtual universe (step 415). Next, the target computer may command the source virtual universe to restore visibility of the avatar (step 419). Visibility may be restored when the source virtual universe sets a predetermined bit in a data record associated with the avatar. The source virtual universe may set the predetermined bit in a manner reciprocal or opposite as when setting a same predetermined bit for inhibiting visibility of the avatar, as explained above.

Figure 5:
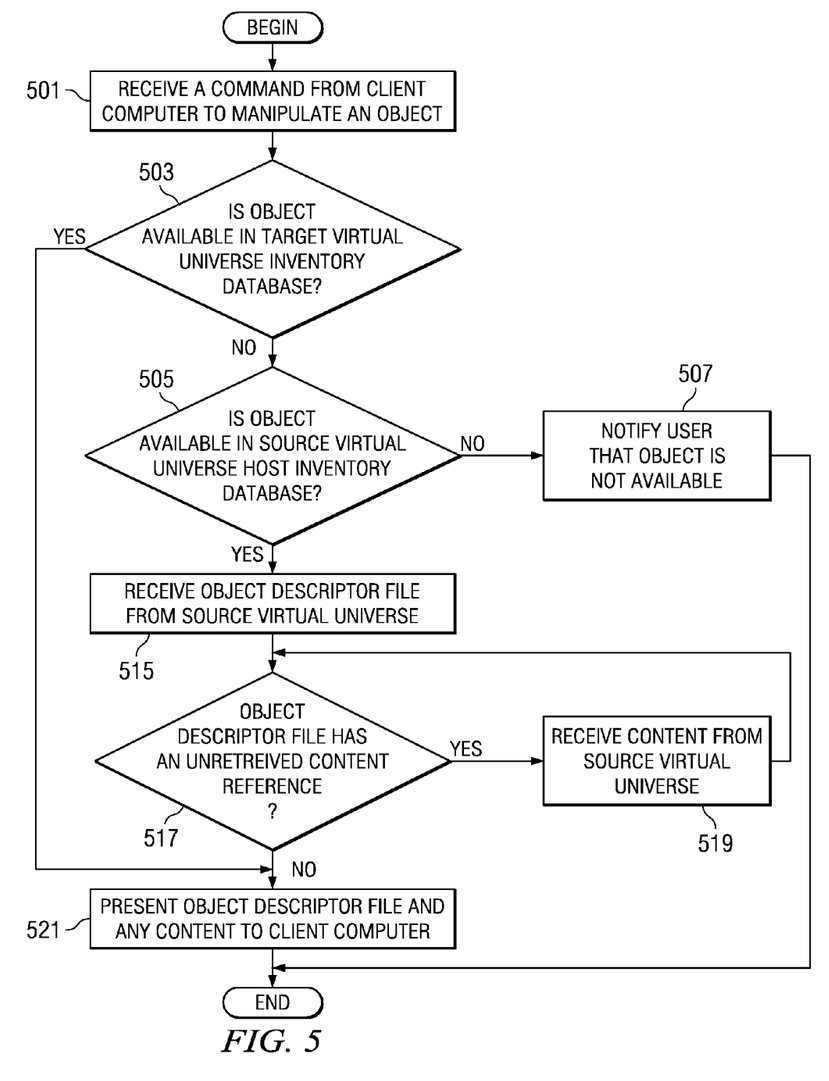
FIG. 5 shows a flowchart of steps to transfer or otherwise copy an object from a source virtual universe inventory database to a target virtual universe inventory database in accordance with an illustrative embodiment of the invention.

FIG. 5 shows a flowchart of steps to transfer or otherwise copy an object from a source virtual universe inventory database to a target virtual universe inventory database in accordance with an illustrative embodiment of the invention. Initially, a target virtual universe may receive a command from a client computer to manipulate an object (step 501). The command may include an identification of the object based on a universally unique identifier (UUID). The target virtual universe makes a determination whether the object is available in the target virtual universe inventory database (step 503). If the object is available, the target virtual universe host presents the object descriptor file and any content to the client computer (step 521). However, if the object is unavailable, the target computer makes a determination if the object is available in a source virtual universe host inventory database (step 505). A positive determination to step 505 causes the target virtual universe to receive an object descriptor file from the source virtual universe (step 515). The object descriptor file is described above in FIG. 2B. A negative determination to step 505 causes the target virtual universe to notify the user that the object is not available (step 507). Processing terminates thereafter.

Next, after step 515, the target virtual universe host determines whether the object descriptor file has unretrieved content references (step 517). Unretrieved content may include, in an example of a polygon-based universe, textures for mapping onto polygons. For example, object descriptor file 280 of FIG. 2 may include texture references within textures 248 of FIG. 2. The unretrieved reference may be in the form of a uniform resource indicator (URI). The URI may point to two-dimensional graphics. The two-dimensional graphics may include, for example, JPEGs and GIFs.

Next, the target virtual universe host may receive content from source virtual universe (step 519). Step 519 may be performed multiple times as each reference is parsed from an object descriptor file in step 517. The determination of step 517 may be negative if there are no content references in the object descriptor file or after all references are retrieved. After a negative determination to step 517, the target virtual universe host may present the object descriptor file and associated content to the client computer (step 521). Consequently, the associated client computer may receive and render the object. Processing terminates thereafter.

Figure 6:
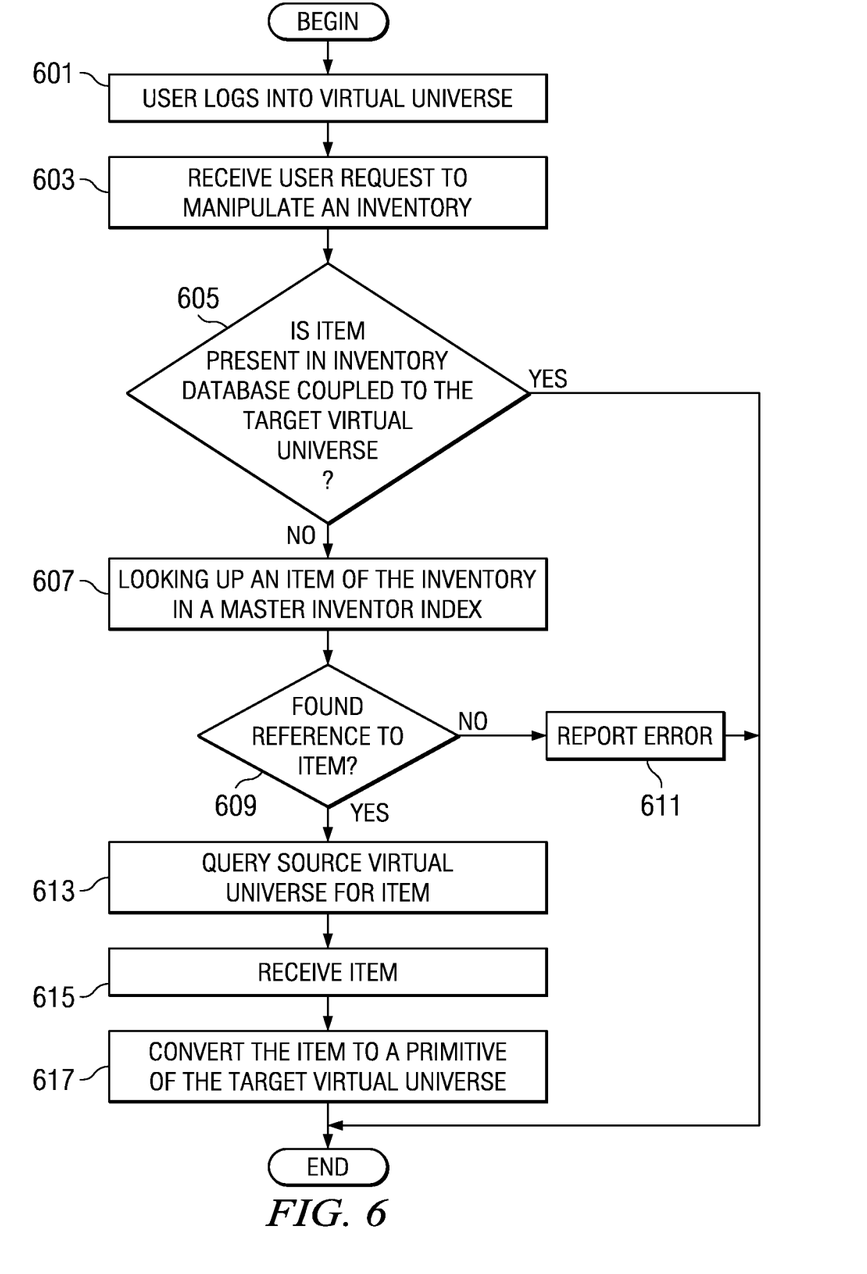
FIG. 6 shows a flowchart of steps to look up an item not present in an inventory database coupled to the target virtual universe in accordance with an illustrative embodiment of the invention.

FIG. 6 shows a flowchart of steps to look up an item not present in an inventory database coupled to the target virtual universe in accordance with an illustrative embodiment of the invention. Initially, a user logs into a target virtual universe host (step 601). Next, the target virtual universe receives a user request to manipulate an inventory (step 603). The request may be a message transmitted from the client computer that includes a universally unique identifier (UUID) or other identifier that uniquely identifies an item of inventory. The target virtual universe host determines whether the item is present in an inventory database coupled to the target virtual universe (step 605). If the determination of step 605 is positive, the target virtual universe processes the manipulation request as normal.

However, if the result of step 605 is negative, the target virtual universe host looks up at least one item of the inventory in a master inventory index (step 607). The target virtual universe host may use the universally unique identifier or other identifier obtained through step 603 as a key to records stored in a table of the master inventory index. The target virtual universe host determines whether the UUID or other identifier can be used to find a reference to an item in the master inventory index (step 609). If the determination is negative, then the target virtual universe host reports an error (step 611). Processing may terminate thereafter.

If, however, the determination is that there is an item referred by the UUID in the master inventory index, then the target virtual universe obtains an identifier of the source virtual universe that stores the item. In addition, the target virtual universe host may obtain an item identifier from the master inventory index. Next, the target virtual universe host queries the source virtual universe for the item (step 613). The target virtual universe host may receive the item (step 615). The item may be, for example, an object descriptor file for an object.

Next, the target virtual universe host may convert the item to a corresponding item in the target virtual universe (step 617). For example, the item may be an object. In this example, the target virtual universe host converts the object to at least one primitive of the target virtual universe in step 617. A primitive is an elemental building block of an object. A primitive of the target virtual universe host may be one of several types depending on the type supported by the virtual universe host. According to a first type, a virtual universe is configured to permit editing and operations on objects based on each object being formed from collections of solids. A solid may be, for example, mathematical expressions of a sphere, a rectangular solid, or an extruded polygon, among many other types of solids. An object may be that space that is the union of spaces occupied by the two or more primitive solids. As an alternative, the object may be a space that is the space occupied by several of the primitive solids. Furthermore, an object may be defined by the space occupied by a first primitive solid, but not occupied by a second solid. A user creates the primitives by entering in the type of objects, dimensions, and the manner in which the primitive solids should be combined. A solid-based virtual universe is a virtual universe that defines objects based on one or more solids.

According to a second type, a virtual universe is configured to enable editing and operations on objects based on each object being formed from collections polygons. A polygon-based virtual universe is a virtual universe that presents objects to client computers based on one or more polygons forming each object. A polygon may have an edge that resembles a curve where the curve is defined by a plurality of short line segments. In addition, many polygons may be linked at their edges to create an apparent curved surface. The collection of polygons may be described in a common file as an object. For example, the object defined in object descriptor file 280 of FIG. 2B is a polygon-based object.

Returning to FIG. 6, the target virtual universe host next converts the object received in step 615 to a primitive of the target virtual universe (step 617). For example, if the source virtual universe was a solid-based virtual universe, then for every face of a primitive that is not located within a union of a second primitive solid, a polygon may be created in a converted object descriptor file. For faces that are flat, this step is straightforward. However, for faces that are curved, for example, a sphere or a solid surface, some degradation may occur. For example, a cone has a circular base and a curved surface that joins the base to an apex. In converting the cone, a target virtual universe host may represent a circle by substituting an octagon or some other polygon with a plurality of equal sides to form a converted cone. In the converted cone, each side of the polygon may form the base of a triangle that forms a third point in a position otherwise occupied by the source cone's apex. Thus, the target virtual universe, in this example, may convert a cone to an octagon and eight triangles. Similarly, the target virtual universe host may copy textures from the surfaces of the solid such that the surfaces are mapped to the faces of polygons in the now-polygon-based conversion of the cone. If the item is a script, the target virtual universe host converts the script accordingly. For example, the script may be expressed in Java language. Each target virtual universe host can run a Java virtual machine to provide bytecode indigenous to the target virtual universe. The process terminates thereafter.

Thus, illustrative embodiments provide a computer implemented method for bringing content of a first virtual universe into a second virtual universe. Where conversions between varying primitive types are necessary, an embodiment convert objects and scripts such that an object within a virtual universe having primitives of one type may also have a corresponding object within a virtual universe having primitives of a second type. In other words, an embodiment may convert objects to a local representational scheme of the virtual universe that the user wants items moved to.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to obtain a copy of an inventory from a source virtual universe to a target virtual universe comprising:
receiving a user request to manipulate an inventory;
determining that the inventory is not present in an inventory database coupled to the target virtual universe;
responsive to a determination that the inventory is not present, looking up at least one item of the inventory in a master inventory index;
receiving a reference to at least one item of the inventory from the master inventory index, wherein the master inventory index hosts references for a source virtual universe and a target virtual universe that participate in a federated access to inventory;

querying the source virtual universe host based on the reference to the at least one item wherein the reference to the at least one item references the source virtual universe; and receiving the at least one item from the source virtual universe.

2. The computer implemented method of claim 1, wherein the at least one item comprises an object geometrically defined to occupy a location of the source virtual universe.

3. The computer implemented method of claim 2, further comprising:

converting the object to a primitive of the target virtual universe.

4. The computer implemented method implemented method of claim 3, further comprising receiving a user login to the target virtual universe.

5. The computer implemented method implemented method of claim 2, wherein the step of querying further comprises:

presenting credentials to the source virtual universe; and transmitting a virtual universe identifier to the source virtual universe.

6. The computer implemented method of claim 5, wherein the step of transmitting comprises:

looking up a virtual universe identifier and an object identifier based on a Universally Unique Identifier (UUID).

* * * * *